United States Patent
Smith et al.

(10) Patent No.: US 10,072,744 B2
(45) Date of Patent: Sep. 11, 2018

(54) ROTARY ACTUATION MECHANISM

(71) Applicant: Sarcos LC, Salt Lake City, UT (US)

(72) Inventors: Fraser M. Smith, Waltham, MA (US); Shane Olsen, Waltham, MA (US); Michael Morrison, Waltham, MA (US); Glenn Colvin, Jr., Waltham, MA (US); Brian Maclean, Waltham, MA (US); Alan Hart, Waltham, MA (US)

(73) Assignee: Sarcos LC, Salt Lake City, UT (US)

( * ) Notice: Subject to any disclaimer, the term of this patent is extended or adjusted under 35 U.S.C. 154(b) by 759 days.

(21) Appl. No.: 13/800,851

(22) Filed: Mar. 13, 2013

(65) Prior Publication Data

US 2014/0260737 A1     Sep. 18, 2014

(51) Int. Cl.
| | |
|---|---|
| *F16H 21/00* | (2006.01) |
| *F16H 21/44* | (2006.01) |
| *F15B 15/06* | (2006.01) |
| *B25J 9/10* | (2006.01) |

(52) U.S. Cl.
CPC .............. *F16H 21/44* (2013.01); *B25J 9/106* (2013.01); *F15B 15/06* (2013.01); *Y10T 29/49826* (2015.01); *Y10T 74/1892* (2015.01)

(58) Field of Classification Search
CPC ............ F16H 21/44; B25J 9/106; F15B 15/06
USPC ...... 74/89.23, 99 R, 101, 102, 103, 105, 25, 74/36; 254/423, 424
See application file for complete search history.

(56) References Cited

U.S. PATENT DOCUMENTS

| | | | | |
|---|---|---|---|---|
| 188,846 | A | * | 3/1877 | Beugger ...................... 254/126 |
| 1,138,715 | A | * | 5/1915 | Young .............................. 74/521 |
| 1,572,918 | A | | 10/1924 | Geddes |
| 2,543,904 | A | * | 3/1951 | Ernst et al. .................... 254/122 |
| 2,624,535 | A | * | 1/1953 | Bollhoefer .................... 248/669 |
| 2,698,753 | A | * | 1/1955 | Kellman et al. ................ 49/349 |
| 3,565,396 | A | * | 2/1971 | Spear ............................. 254/424 |
| 4,103,869 | A | * | 8/1978 | Mesny et al. ................. 254/425 |
| 6,224,319 | B1 | * | 5/2001 | Velikov ..................... B25J 9/104 |
| | | | | 414/744.5 |
| 6,227,776 | B1 | * | 5/2001 | Kitamura ................. B23Q 1/44 |
| | | | | 409/159 |
| 6,464,448 | B1 | * | 10/2002 | Ha ........................... B25J 9/104 |
| | | | | 414/744.5 |
| 6,840,732 | B2 | * | 1/2005 | Minami ............... B65G 47/904 |
| | | | | 414/744.5 |
| 6,907,853 | B2 | * | 6/2005 | Noguchi .................... 123/90.17 |

(Continued)

FOREIGN PATENT DOCUMENTS

GB          2038984          10/1979

*Primary Examiner* — William C Joyce (57) ABSTRACT

A rotary actuation mechanism comprising an actuator having a body, and a slider movable on a linear path relative to the body. A first linkage can be pivotally coupled to the body at a first pivot having a first axis. A second linkage can be pivotally coupled to the slider at a second pivot having a second axis, and pivotally coupled to the first linkage at a third pivot. A length of the first linkage between the first pivot and the third pivot can be equal to a length of the second linkage between the second pivot and the third pivot. The slider can be movable to position the second axis in a collinear relationship with the first axis. The rotary actuation mechanism can include an anti-singularity device to constrain movement of the body when the first axis and the second axis are in the collinear relationship.

19 Claims, 8 Drawing Sheets

(56) References Cited

U.S. PATENT DOCUMENTS

| | | | |
|---|---|---|---|
| 7,188,598 B2 | 3/2007 | Sic et al. | |
| 7,210,446 B2 | 5/2007 | Sic et al. | |
| 7,363,760 B1 | 4/2008 | McCrea | |
| 8,382,421 B2* | 2/2013 | Musha | B25J 9/042 414/744.5 |
| 8,567,763 B1* | 10/2013 | Nolan | 254/122 |
| 2008/0296542 A1* | 12/2008 | Manev et al. | 254/88 |
| 2008/0314356 A1 | 12/2008 | Kamen et al. | |
| 2010/0325797 A1* | 12/2010 | Horne | 5/611 |
| 2011/0011078 A1 | 1/2011 | Kamen et al. | |
| 2011/0011079 A1 | 1/2011 | Kamen et al. | |

* cited by examiner

ROTARY ACTUATION MECHANISM

BACKGROUND

Many robotic mechanisms require rotational motion for degrees of freedom. Depending upon the application, such degrees of freedom can require high ranges of motion (greater than +/−70 degrees). Industrial robots are capable of achieving high ranges of motion, and often utilize electric motors or hydraulic actuators with gear mechanisms to achieve the desired range of motion. Many robots, however, also require a compact form factor, low stiction and backlash, and lightweight structures that can support external structural forces, often leading designers of such robots to employ other power sources such as hydraulics or pneumatics. Some robots, for example, include anthropomorphic features to represent or mimic, for example, a human arm or leg. Human arms and legs have rotational degrees of freedom, such as humeral rotation, wrist rotation, thigh rotation, and calf rotation. Rotary actuators can be inherently rotational or can utilize a linear actuator with a mechanical mechanism. Typical approaches include the use of single and double vane rotary actuators, linear actuators using a simple crank, a bell crank, or "back hoe bucket" type linkages, and pulley and tendon mechanisms. Other methods such as rack and pinion methods, displacement gear motors, radial pistons driving a crank, and helical twister actuators have also been used.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although many robotic rotary actuators have been utilized in the past, the previous linear actuation mechanisms have limitations that prevent the simultaneous attainment of high range of motion, low stiction and backlash, a compact form factor, and lightweight, which results in design compromises that can limit robot performance. For example, for anthropomorphic robot applications, linear actuators can be problematic when fitting an anthropomorphic form factor. In such applications, the desired range of motion can be high (i.e., greater than 70 degrees). For instance, about 180 degrees is needed to approximate wrist or humeral rotation. Such ranges of motion can be difficult to achieve using a linear actuator in a form factor representing a human arm or leg. In addition, linear actuation of in-plane joint rotations on anthropomorphic robots is problematic when high torque output is required over large ranges of motion. Robotic joints requiring large range of motion, high torque in-plane rotations include the anthropomorphic elbow, hip, and knee flex/extend degrees of freedom.

Accordingly, a rotary actuation mechanism is disclosed that can increase the range of motion and improve torque output over the range of motion of a rotary joint utilizing a linear actuator without the use of a complex linkage. In one aspect, the rotary actuation mechanism can provide a compact form factor. The rotary actuation mechanism can include an actuator having a body, and a slider movable on a linear path relative to the body. A first linkage can be pivotally coupled to the body at a first pivot having a first axis. A second linkage can be pivotally coupled to the slider at a second pivot having a second axis, and pivotally coupled to the first linkage at a third pivot. A length of the first linkage between the first pivot and the third pivot can be equal to a length of the second linkage between the second pivot and the third pivot. The slider can be movable to position the second axis in a collinear relationship with the first axis. The rotary actuation mechanism can also include an anti-singularity device to constrain movement of the body when the first axis and the second axis are in a collinear relationship. In other words, the anti-singularity device can facilitate movement of the first axis and the second axis out of the collinear relationship.

Figure 1:
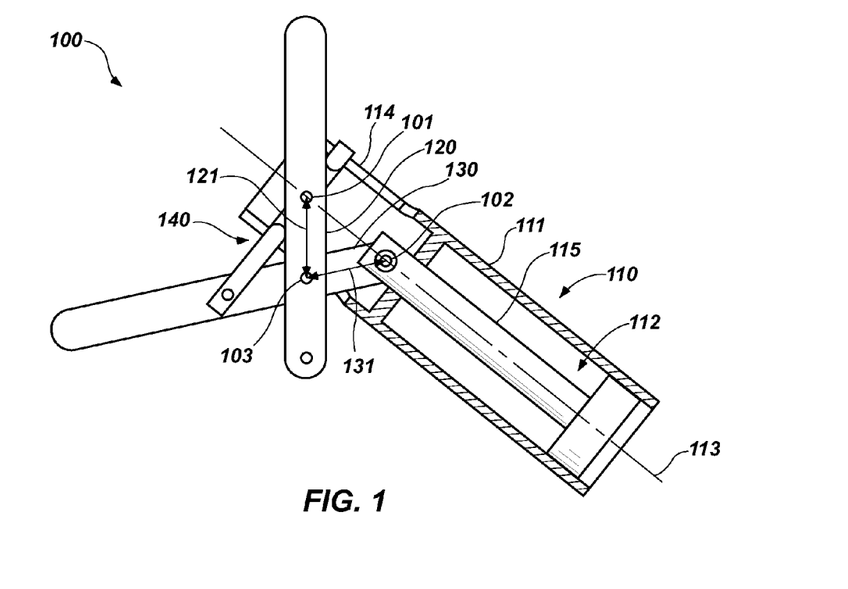
FIG. 1 is an example illustration of a rotary actuation mechanism in accordance with an embodiment of the present invention.

One embodiment of a rotary actuation mechanism 100 is illustrated in FIG. 1. The rotary actuation mechanism 100 can comprise an actuator 110, a first linkage 120, a second linkage 130, and an anti-singularity device 140. The actuator 110 can have a body 111 and a slider 112 movable on a linear path 113 relative to the body 111. The first linkage 120 can be pivotally coupled to the body 111, such as to an extension 114 of the body, at a first pivot 101 having a first axis (extending out of the page at the center of the first pivot 101). The second linkage 130 can be pivotally coupled to the slider 112, such as to a shaft 115 of the slider 112, at a second pivot 102 having a second axis (extending out of the page at the center of the second pivot 102). The second linkage 130 can also be pivotally coupled to the first linkage 120 at a third pivot 103 having a third axis (extending out of the page at the center of the third pivot 103).

In one aspect, the extension 114 of the body 111 can be configured to position the first pivot 101 such that the slider 112 is at about a midpoint of its range of travel when the axis of the first pivot 101 and the axis of the second pivot 102 are collinear. This configuration can allow the rotary actuation mechanism 100 to double its range of motion over a typical crank configuration for a rotary mechanism using a linear actuator. The rotary actuation mechanisms of the present disclosure can have fewer linkage members, which can provide a simplified and more compact mechanism compared to other large range of motion rotary mechanisms using linear actuators, as well as having fewer high load bearing linkages than, for example, a "backhoe" configuration.

With further reference to FIG. 1, a length 121 of the first linkage 120 between the first pivot 101 or axis and the third pivot 103 or axis can be equal to a length 131 of the second linkage 130 between the second pivot 102 or axis and the third pivot 103 or axis. In this configuration, the slider 112 is movable to position the second pivot 102 such that the second axis is in a collinear relationship with the first axis of the first pivot 101. As shown and described further hereinafter, a singularity is created when the first axis and the second axis are in a collinear relationship, which can result in unconstrained movement of the actuator 110 that can prevent movement of the first and second axes out of the collinear relationship. Thus, rotary actuation mechanism 100 can further comprise, in some embodiments, the anti-singularity device 140, which can constrain movement of the actuator 110 and facilitate movement of the first axis of the first pivot 101 and the second axis of the second pivot 102 out of the collinear relationship. By eliminating the negative effects of the singularity, the anti-singularity device 140 can enable the rotary actuation mechanism 100 to function properly through an entire range of motion of the actuator 110, which can include passing through the singularity.

Figures 2A, 2B:
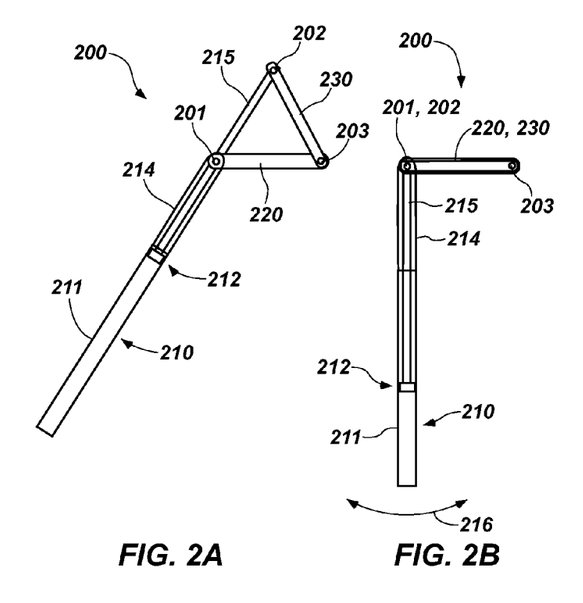
FIGS. 2A-2C are example illustrations of a rotary actuation mechanism in accordance with another embodiment of the present invention.
Figure 2C:
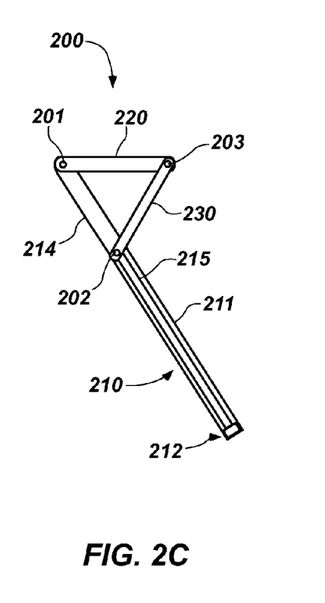

FIGS. 2A-2C illustrate movement of a rotary actuation mechanism 200 and the negative effects of a singularity. For example, the rotary actuation mechanism 200 can comprise an actuator 210, a first linkage 220, and a second linkage 230. The first linkage 220 can be pivotally coupled to an extension 214 of the actuator body 211 at a first pivot 201 having a first axis. The second linkage 230 can be pivotally coupled to a shaft 215 of the actuator slider 212 at a second pivot 202 having a second axis. The shaft 215 can be configured to extend from the actuator body 211. The second linkage 230 can also be pivotally coupled to the first linkage 220 at a third pivot 203. FIGS. 2A and 2C illustrate the rotary actuation mechanism 200 at the limits of the range of motion of the actuator 210, which are found on "opposite sides" of the singularity configuration illustrated in FIG. 2B where the first pivot 201 axis and the second pivot 202 axis are collinear. In the singularity configuration, movement of the actuator 210 is unconstrained such that the actuator 210 can rotate bi-directionally as indicated at 216 about the axes of the first and second pivots 201, 202. Although the first linkage 220 is shown as being fixed to ground, it should be recognized that any one of the first linkage 220, the second linkage 230, the actuator body 211, or the actuator slider 212 can be in a fixed position. In one aspect, the first and second linkages 220, 230 can be part of a robotic arm, where the third pivot 203 is a joint or rotational degree of freedom of the robotic arm. Accordingly, the rotary actuation mechanism 200 can be configured to favor a longitudinal in-line form factor suitable for a robotic arm.

Figure 3A:
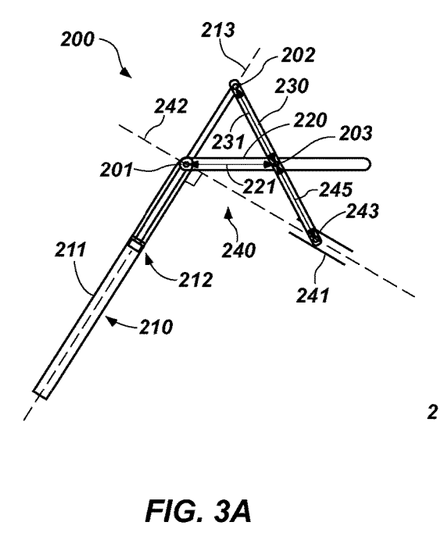
FIGS. 3A and 3B are example illustrations of the rotary actuation mechanism of FIGS. 2A-2C, with an anti-singularity device in accordance with an embodiment of the present invention.
Figure 3B:
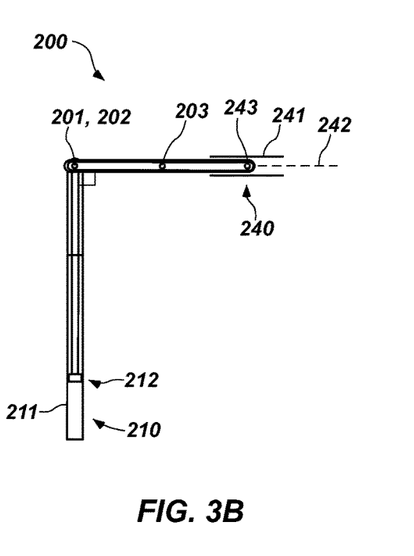

In order to constrain the movement of the actuator 210 when in the singularity configuration, the rotary actuation mechanism 200 can also include an anti-singularity device 240, as illustrated in FIGS. 3A and 3B. In this case, the anti-singularity device 240 includes a slider 241 coupling the body 211 and the second linkage 230, such that a linear path 242 of the slider 241 relative to the body 211 intersects the axis of the first pivot 201 perpendicular to the linear path 213 of the slider 212. The slider 241 can be pivotally coupled to the second linkage 230 at 243 to facilitate rotation of the slider 241 during movement of the mechanism 200. As with some other embodiments disclosed herein, a length 221 of the first linkage 220 between the first pivot 201 or axis and the third pivot 203 or axis can be equal to a length 231 of the second linkage 230 between the second pivot 202 or axis and the third pivot 203 or axis. In addition, a length 245 of the second linkage 230 between the second pivot 202 or axis and the pivotal coupling 243 or axis with the slider 241 can be equal to the lengths 221, 231 to maintain the perpendicular relationship with the linear path 213 of the actuator slider 212. Thus, when in the singularity configuration, shown in FIG. 3B, the anti-singularity device 240 constrains movement of the body 211 of the actuator 210 and facilitates movement of the mechanism 200 out of the singularity configuration. Thus, the anti-singularity device 240 can facilitate movement of the mechanism 200 through the entire range of motion of the actuator 210, without the mechanism 200 being inadequately constrained allowing the mechanism 200 to be "hung up" in the singularity configuration.

Figure 4A:
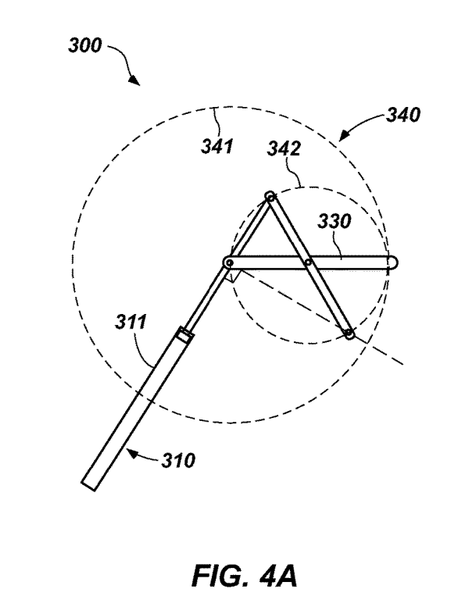
FIGS. 4A and 4B are example illustrations of a rotary actuation mechanism with an anti-singularity device in accordance with another embodiment of the present invention.
Figure 4B:
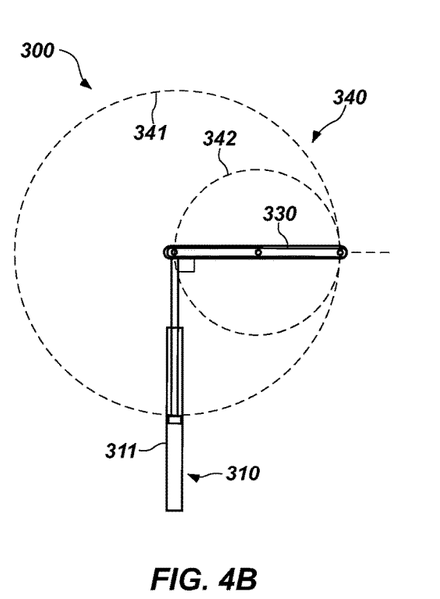

FIGS. 4A and 4B illustrate another example of an anti-singularity device 340 operable with a rotary actuation mechanism. For example, the anti-singularity device 340 of rotary actuation mechanism 300 can comprise a gear configuration, in which a first gear 341 can be coupled to the actuator body 311, and a second gear 342 can be coupled to the second linkage 330. The interfacing first and second gears 341, 342 can constrain movement of the actuator 310 when in the singularity configuration, shown in FIG. 4B. In one aspect, a ratio of the first gear 341 to the second gear 342 can be 2:1. Although anti-singularity devices have been illustrated as having a slider and a gear, it should be recognized that an anti-singularity device can comprise any suitable feature or configuration. For example, an anti-singularity device can comprise a slider, a gear, a belt, a pin, a fork, a slot, a linear actuator, or any other suitable feature, alone or in any combination. In one aspect, the anti-singularity mechanism can comprise a low load force element.

Furthermore, an actuator in accordance with the present disclosure can comprise a linear actuator operating with hydraulics, pneumatics, an electric motor, a screw, or any other suitable actuator feature, alone or in any combination. In one aspect, a linear actuator can be single acting or double acting. In another aspect, a linear actuator can comprise only a single piston or two pistons. Whether a linear actuator utilizes a piston, a screw, etc. to achieve motion along a linear path, the portion of the linear actuator that is movable along the linear path relative to the actuator body is referred to herein as a "slider." In some embodiments, a rotary actuation mechanism of the present disclosure can utilize a linear actuator having low leakage and friction relative to rotary actuator vane seals, thus improving overall system power efficiency. It should be recognized, that although descriptions of rotary actuation mechanisms generally refer to an "actuator," as used herein, an actuator can also include dampening devices, such as shock absorbers, and brakes. Thus, the exemplary rotary actuation mechanisms disclosed herein can be configured to not only impart force, but can also absorb or resist force, as well.

Figure 5A:
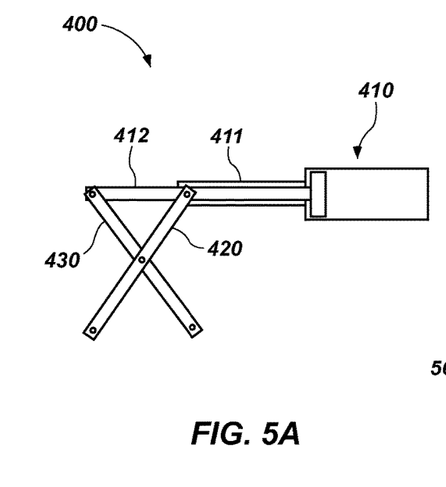
FIGS. 5A-5D are example illustrations of actuator configurations of rotary actuation mechanisms in accordance with several embodiments of the present invention.

FIGS. 5A-5D illustrate several example embodiments of actuator configurations for use within a rotary actuation mechanism in accordance with the present disclosure. Anti-singularity devices are omitted for clarity, but those skilled in the art will recognize how one may be implemented with the various designs. FIG. 5A shows an actuator 410 of rotary actuation mechanism 400 having a body 411 pivotally coupled to a first linkage 420 and a slider 412 pivotally coupled to a second linkage 430. This configuration is also illustrated in FIGS. 1-4B, discussed hereinabove. In this rotary actuation mechanism configuration, the output torque profile is sinusoidal in shape with 0.707 Peak torque at +/−180 degrees, and the torque profile acts over a range of 360 degrees with a torque of zero at +/−180 degrees. This joint torque profile is flatter over a greater angular range and is higher at the range limits than a typical rotary actuation mechanism using a linear actuator with a crank.

Figure 5B:
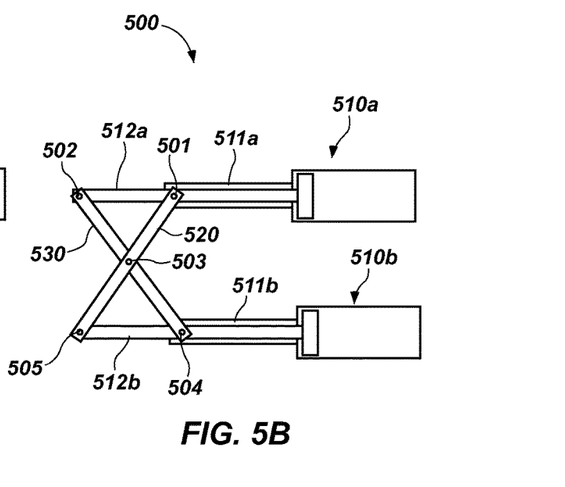

FIG. 5B illustrates a multiple actuator configuration in which rotary actuation mechanism 500 includes a first actuator 510*a* and a second actuator 510*b* in a parallel relationship or arrangement with one another. The first actuator 510*a* has a body 511*a* pivotally coupled to a first linkage 520 at a pivot 501 and a slider 512*a* pivotally coupled to a second linkage 530 at a pivot 502. The second actuator 510*b* has a body 511*b* pivotally coupled to the second linkage 530 at a pivot 504 and a slider 512*b* pivotally coupled to the first linkage 520 at a pivot 505. In the parallel arrangement shown, the respective actuator bodies 511*a*, 511*b* and sliders 512*a*, 512*b* are pivotally coupled to different linkages, such that the actuators can function "in phase" with one another. In an alternative parallel arrangement (see FIGS. 7A-7C), respective actuator bodies and sliders can be pivotally coupled to the same linkage, such that the actuators can function "out of phase" with one another. A parallel arrangement can effectively double the torque applied by the mechanism over a portion of the range of motion over that available from only a single actuator. In one aspect, parallel actuators can be configured to be balanced in a pure moment force couple. This can reduce or minimize load on the pivot 503 coupling the first linkage 520 and the second linkage 530.

Figures 5C, 5D:
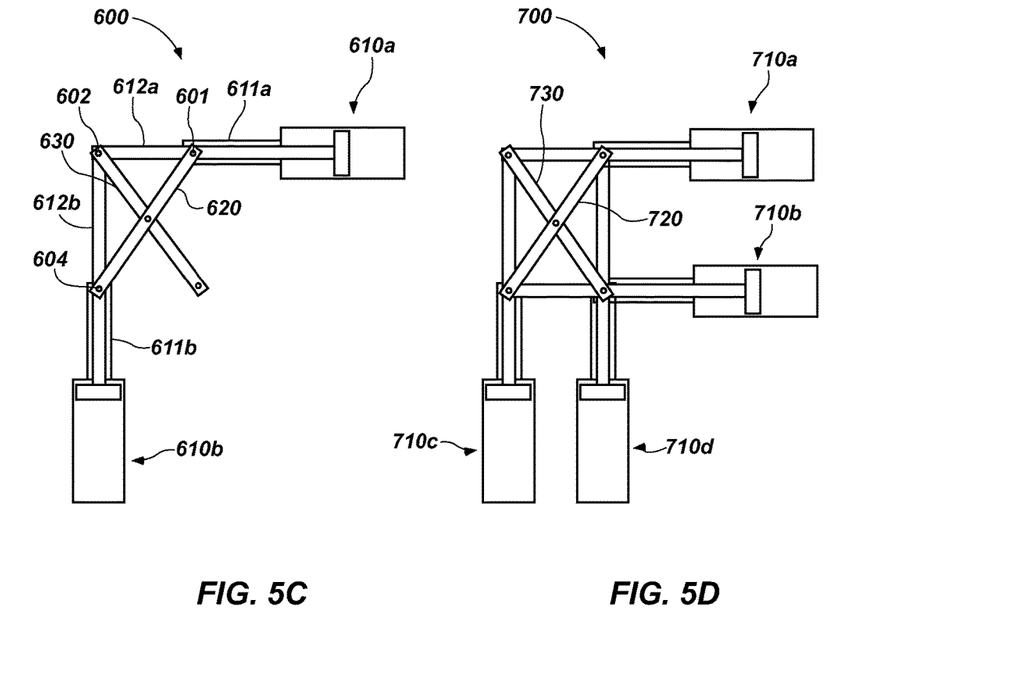

FIG. 5C illustrates another multiple actuator configuration in which rotary actuation mechanism 600 includes a first actuator 610*a* and a second actuator 610*b* in a perpendicular relationship or arrangement with one another. The first actuator 610*a* has a body 611*a* pivotally coupled to a first linkage 620 at a pivot 601 and a slider 612*a* pivotally coupled to a second linkage 630 at a pivot 602. The second actuator 610*b* has a body 611*b* pivotally coupled to the first linkage 620 at a pivot 604 and a slider 612*b* pivotally coupled to the second linkage 630 at the pivot 602. In the perpendicular arrangement shown, the respective actuator bodies 611*a*, 611*b* and sliders 612*a*, 612*b* are pivotally coupled to the same linkages. In an alternative perpendicular arrangement (not shown here), respective actuator bodies and sliders can be pivotally coupled to different linkages. A perpendicular arrangement can increase the range of motion of a rotary actuation mechanism and/or be used to tailor the torque profile of the rotary actuation mechanism. For example, a perpendicular arrangement can be used to "level" or "smooth out" the torque applied by the rotary actuation mechanism over the range of motion of the mechanism, when compared to only a single actuator or only parallel actuators.

FIG. 5D illustrates a multiple actuator configuration in which rotary actuation mechanism 700 includes a first actuator 710*a* and a second actuator 710*b* pivotally coupled to first and second linkages 720, 730 in a first parallel arrangement, and a third actuator 710*c* and a fourth actuator 710*d* pivotally coupled to the first and second linkages 720, 730 in a second parallel arrangement, such that the first and second parallel arrangements are perpendicular to one another. Like the rotary actuation mechanism 600 in FIG. 5C, this arrangement can serve to flatten the torque profile applied by the rotary actuation mechanism over the range of motion of the mechanism, while doubling the torque available over a portion of the range of motion, similar to that of FIG. 5B.

It should be recognized that a rotary actuation mechanism as disclosed herein can be actuated, for example, at least by a single double acting actuator, two single acting actuators, two double acting actuators in parallel, four single acting actuators in parallel.

Figure 6A:
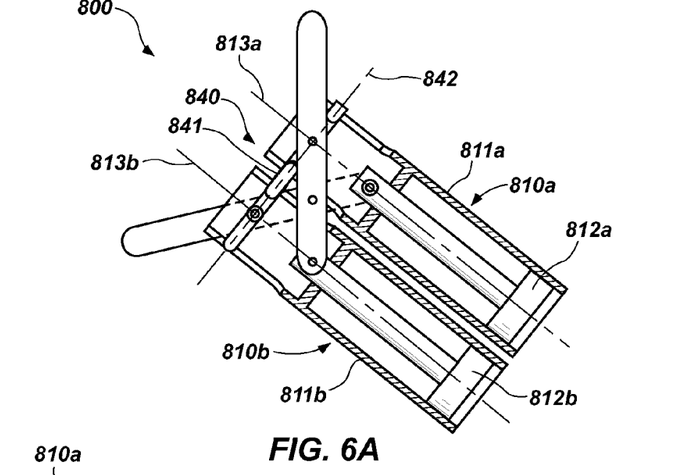
FIGS. 6A-6C are example illustrations of a rotary actuation mechanism in accordance with an embodiment of the present invention.
Figure 6B:
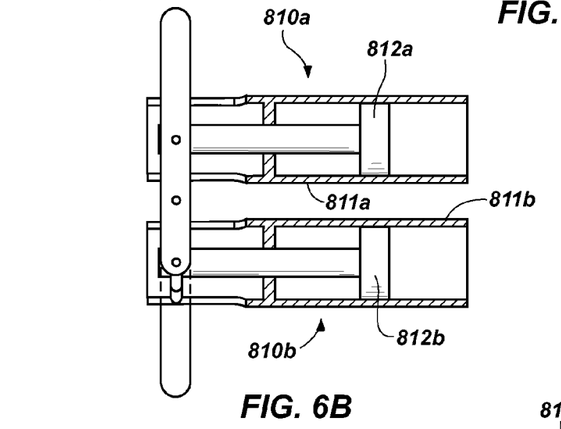
Figure 6C:
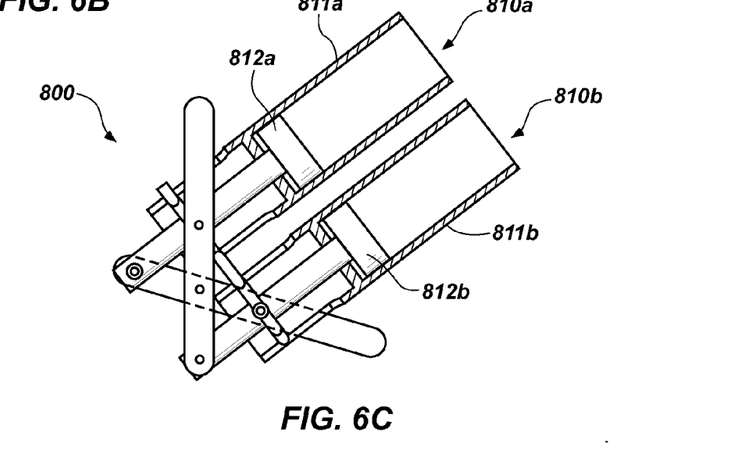

FIGS. 6A-6C illustrate one embodiment of a rotary actuation mechanism 800 having two actuators 810*a*, 810*b* in a parallel relationship or arrangement with one another similar to that shown in FIG. 5B. FIGS. 6A-6C illustrate the mechanism 800 throughout a range of motion of the actuators 810*a*, 810*b*. It can be seen that the actuators 810*a*, 810*b* maintain the parallel relationship with one another throughout the range of motion, although the actuator bodies 811*a*, 811*b* move relative to one another. It can also be observed that the sliders 812*a*, 812*b* are "in phase" with one another throughout the range of motion. In this embodiment, an anti-singularity device 840 is operable with both the actuators 810*a*, 810*b*. For example, the anti-singularity device 840 includes a slider 841 that couples the bodies 811*a*, 811*b* of the parallel actuators 810*a*, 810*b*, such that a linear path 842 of the slider 841 is perpendicular to the linear paths 813*a*, 813*b* of the sliders 812*a*, 812*b*. The slider 841 can be coupled to the actuator body 811*b* and slidably coupled to the actuator body 811*a* in order to function as an anti-singularity device while allowing the actuator bodies 811a, 811b to move relative to one another throughout the range of motion.

Figure 7A:
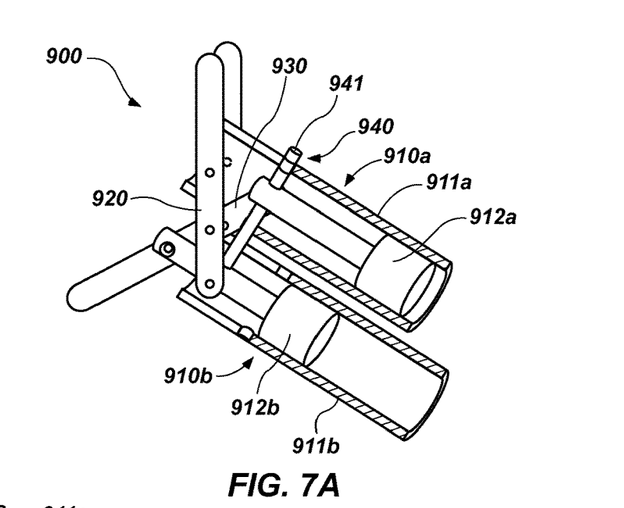
FIGS. 7A-7C are example illustrations of a rotary actuation mechanism in accordance with another embodiment of the present invention.
Figure 7B:
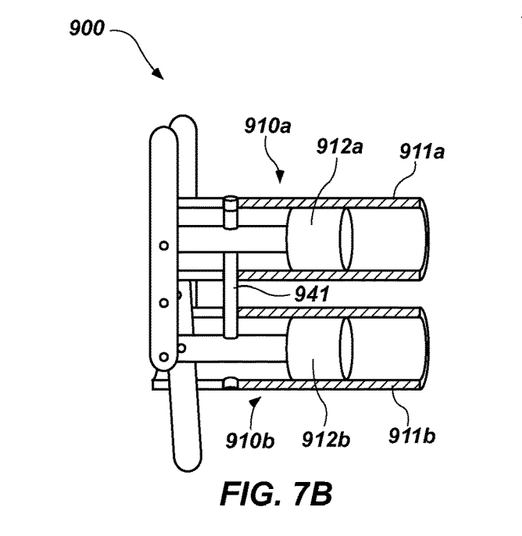
Figure 7C:
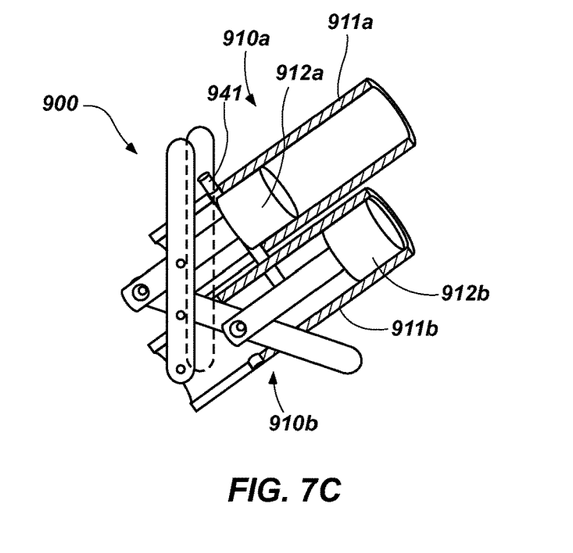
Figure 8A:
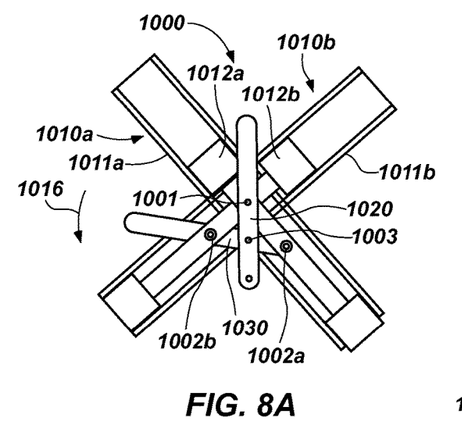
FIGS. 8A-8F are example illustrations of a rotary actuation mechanism in accordance with yet another embodiment of the present invention.
Figure 8B:
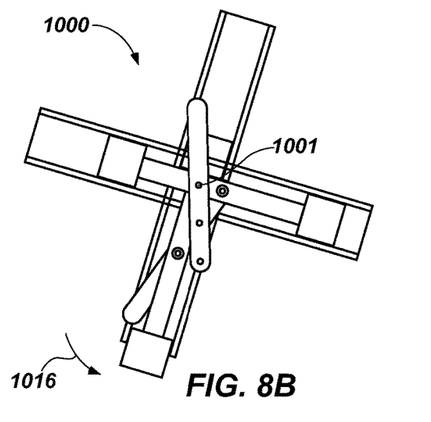
Figure 8C:
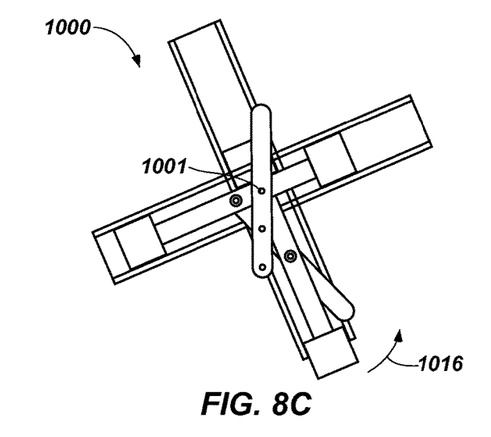
Figure 8D:
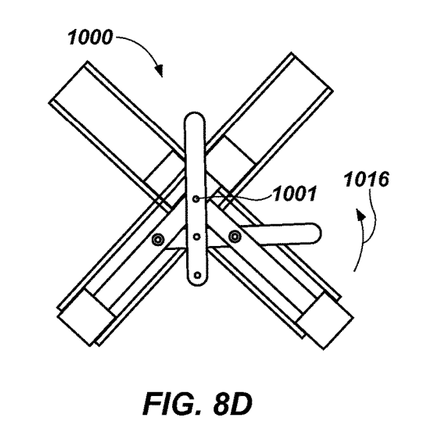
Figure 8E:
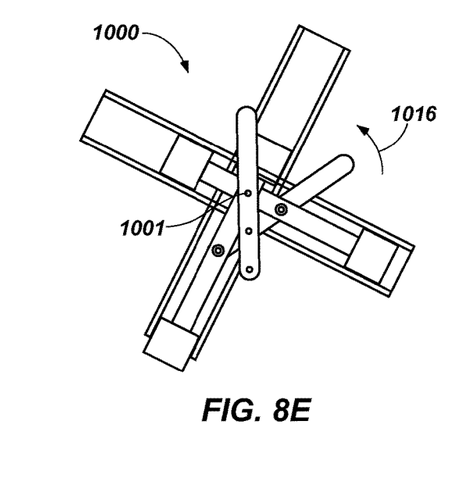
Figure 8F:
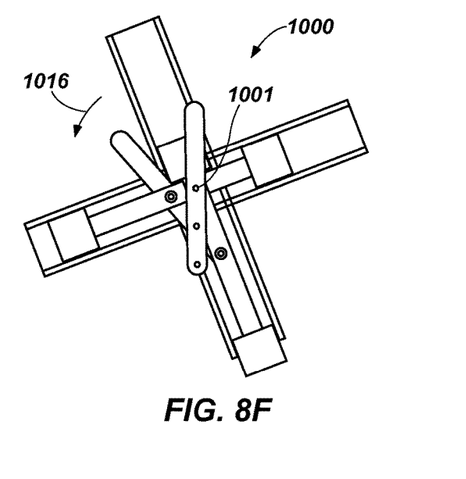

In another aspect, FIGS. 7A-7C illustrate an embodiment of a rotary actuation mechanism 900 having two actuators 910a, 910b in a parallel relationship or arrangement with one another in which respective actuator bodies 911a, 911b and sliders 912a, 912b are pivotally coupled to the same linkage, such that the actuators can function "out of phase" with one another. FIGS. 7A-7C illustrate the mechanism 900 throughout a range of motion of the actuators 910a, 910b. In this example, actuator bodies 911a, 911b are both pivotally coupled to the first linkage 920, and sliders 912a, 912b are both pivotally coupled to the second linkage 930. The rotary actuation mechanism 900 also includes an anti-singularity device 940 operable with both the actuators 910a, 910b. In this case, a slider 941 of the anti-singularity device 940 is coupled to the sliders 912a, 912b of the parallel actuators 910a, 910b. The slider 941 can be coupled to the slider 911b and slidably coupled to slider 911a in order to function as an anti-singularity device while allowing the actuator bodies 911a, 911b to move relative to one another throughout the range of motion.

FIGS. 8A-8F illustrate an embodiment of a rotary actuation mechanism 1000 having two actuators 1010a, 1010b in a perpendicular relationship or arrangement with one another, and further illustrate a range of motion of the rotary actuation mechanism 1000. In this case, the bodies 1010a, 1010b are fixed relative to one another and pivotally coupled to the first linkage 1020 at a pivot 1001. Sliders 1012a, 1012b of the perpendicular actuators 1010a, 1010b are pivotally coupled to the second linkage 1030 at pivots 1002a, 1002b. The first and second linkages 1020, 1030 are also pivotally coupled to one another at pivot 1003. As shown sequentially in FIGS. 8A-8F, the rotary actuation mechanism 1000 can be configured for continuous rotary motion about the axis of the first pivot 1001 in direction 1016 upon actuation of the actuators 1010a, 1010b. In one aspect, the rotary actuation mechanism 1000 can be configured for oscillatory rotary motion about the axis of the first pivot 1001. It should be noted that in this embodiment, one of the actuators 1010a, 1010b can function as an anti-singularity device.

Figure 9A:
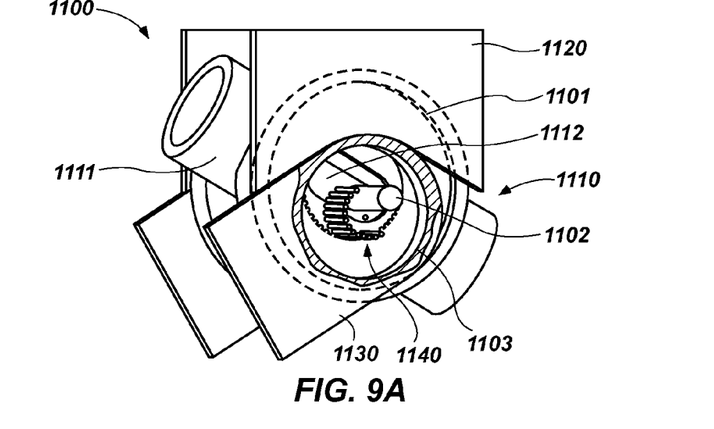
FIGS. 9A-9C are example illustrations of a rotary actuation mechanism in accordance with still another embodiment of the present invention.
Figure 9B:
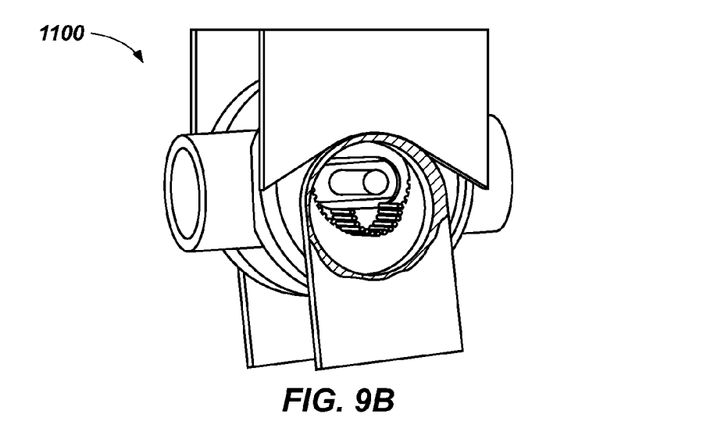
Figure 9C:
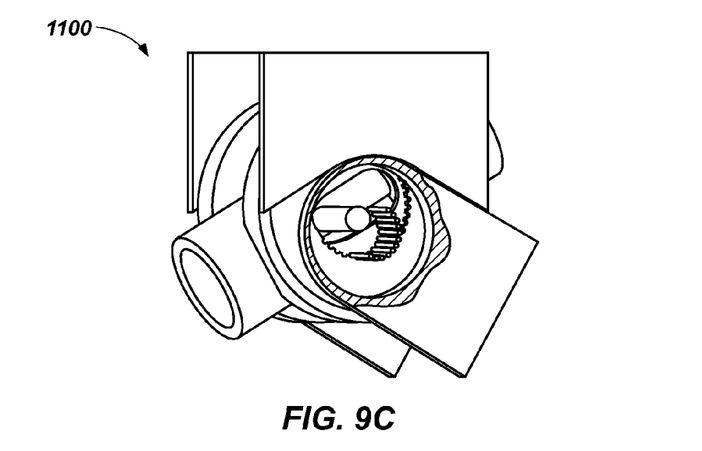

FIGS. 9A-9C illustrate another embodiment of a rotary actuation mechanism 1100, and its range of motion. Although different in appearance, the rotary actuation mechanism 1100 includes similar elements as other rotary actuation mechanisms discussed hereinabove, namely, an actuator 1110, a first linkage 1120, a second linkage 1130, and an anti-singularity device 1140. A body 1111 of the actuator 1110 is pivotally coupled to the first linkage 1120 at a pivot 1101, and a slider 1112 of the actuator 1110 is pivotally coupled to the second linkage 1130 at a pivot 1102. The first linkage 1120 and the second linkage 1130 are pivotally coupled to one another at a pivot 1103. This embodiment illustrates that pivots, such as pivot 1101 and pivot 1103, can be of any suitable size, for example, to accommodate high loads. Regardless of the pivot diameter, each pivot has an axis that can be spatially related to other pivot axes as disclosed herein. The anti-singularity device 1140 illustrates an embodiment of a gear-type anti-singularity device. In this, case, gear teeth 1144 are associated with the body 1111, and a series of pins 1145 configured to mesh with the teeth 1144 are associated with the second linkage 1130. As shown in the figures, the actuator 1110 can therefore move throughout its range of motion without experiencing problems at the singularity illustrated in FIG. 9B.

Figure 10A:
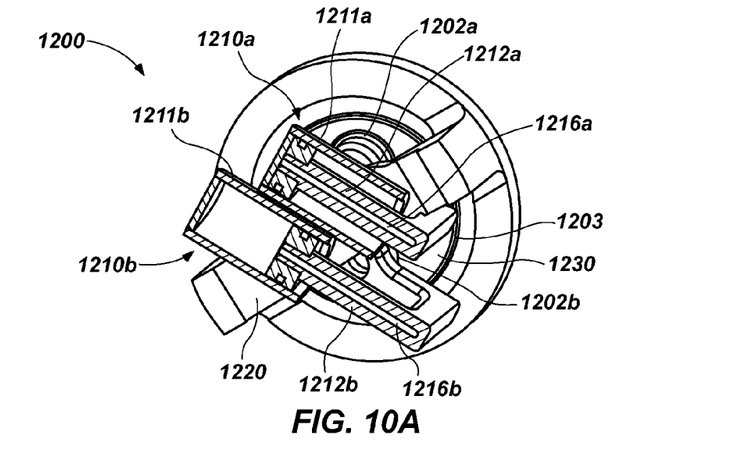
FIGS. 10A-10C are example illustrations of a rotary actuation mechanism in accordance with a further embodiment of the present invention.
Figure 10B:
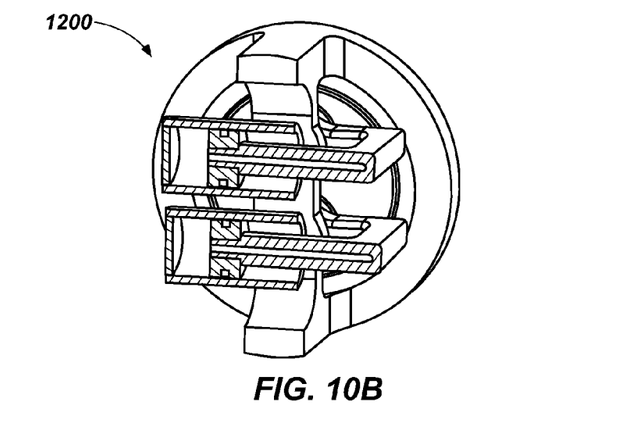
Figure 10C:
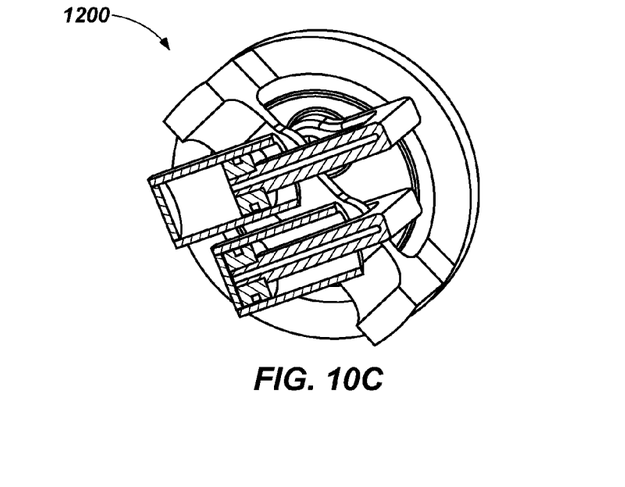

FIGS. 10A-10C illustrate another embodiment of a rotary actuation mechanism 1200, and its range of motion, the mechanism 1200 utilizing one or more large diameter pivots. In this embodiment, the rotary actuation mechanism 1200 includes two actuators 1210a, 1210b in a parallel relationship or arrangement with one another. Here, bodies 1211a, 1211b of both actuators 1210a, 1210b are pivotally coupled to the first linkage 1220 (at pivots hidden from view), and sliders 1212a, 1212b of both actuators 1210a, 1210b are pivotally coupled to the second linkage 1230 (at pivots 1202a, 1202b). Thus, the actuators 1210a, 1210b are out of phase with one another. The first and second linkages 1220, 1230 are pivotally coupled to one another at pivot 1203. In one aspect, the actuators 1210a, 1210b can be pivotally coupled to "ground" such that hydraulic lines can feed through the pivot to power the actuator. For example, as shown in the figures, hydraulic conduits 1216a, 1216b can pass through the pivots 1202a, 1202b and the sliders 1212a, 1212b to fluidly couple with the actuator bodies 1211a, 1211b. This can provide a stable and secure hydraulic connection for the actuators 1210a, 1210b and avoid having hydraulic lines moving about and being exposed to possible damage as the rotary actuation mechanism 1200 operates. It should also be recognized that a hydraulic conduit can fluidly couple with an actuator body via a pivotal coupling of the body and the first linkage. It should be understood that the rotary actuation mechanism 1200 can also include an anti-singularity device in accordance with the principles disclosed hereinabove, although the anti-singularity device is not shown in FIGS. 10A-10C.

In accordance with one embodiment of the present invention, a method for facilitating rotary actuation within a rotary actuation mechanism is disclosed. The method can comprise obtaining an actuator having a body and a slider movable on a linear path relative to the body. The method can also comprise facilitating pivotal coupling of a first linkage to the body at a first pivot having a first axis. The method can further comprise facilitating pivotal coupling of a second linkage to the slider at a second pivot having a second axis, and facilitating pivotal coupling of the second linkage to the first linkage at a third pivot, wherein a length of the first linkage between the first pivot and the third pivot can be equal to a length of the second linkage between the second pivot and the third pivot, wherein the slider is movable to position the second axis in a collinear relationship with the first axis. Additionally, the method can comprise constraining movement of the body when the first axis and the second axis are in the collinear relationship. It is noted that no specific order is required in this method, though generally in one embodiment, these method steps can be carried out sequentially.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A rotary actuation mechanism, comprising:
    an actuator having a body and a first slider movable on a first linear path relative to the body;
    a first linkage pivotally coupled to the body at a first pivot having a first axis;
    a second linkage pivotally coupled to the slider at a second pivot having a second axis, and pivotally coupled to the first linkage at a third pivot,
    wherein a length of the first linkage between the first pivot and the third pivot is equal to a length of the second linkage between the second pivot and the third pivot,
    wherein the first slider is movable to position the second axis in a collinear relationship with the first axis; and
    an anti-singularity device having a second slider coupling the body and the second linkage, wherein a second linear path of the second slider relative to the body intersects the first axis perpendicular to the first linear path of the first slider, the anti-singularity device being operable to prevent rotation of the body relative to the first and second linkages about the first axis and the second axis when the first and second axes are in the collinear relationship.

2. The rotary actuation mechanism of claim 1, wherein the body comprises an extension, the first linkage being pivotally coupled to the extension at the first pivot.

3. The rotary actuation mechanism of claim 2, wherein the linear actuator comprises hydraulics, pneumatics, an electric motor, a screw, or combinations thereof.

4. The rotary actuation mechanism of claim 2, wherein the linear actuator is single acting or double acting.

5. The rotary actuation mechanism of claim 2, wherein the linear actuator comprises a single piston or two pistons.

6. The rotary actuation mechanism of claim 1, wherein the actuator comprises a linear actuator.

7. The rotary actuation mechanism of claim 1, wherein the slider comprises a shaft extending from the body.

8. The rotary actuation mechanism of claim 1, further comprising a second actuator pivotally coupled to the first linkage and second linkage, the second actuator having a second body, and a third slider movable on a third linear path relative to the second body.

9. The rotary actuation mechanism of claim 8, wherein the first linkage is pivotally coupled to the third slider at a fourth pivot, and the second linkage is pivotally coupled to the second body at a fifth pivot.

10. The rotary actuation mechanism of claim 8, wherein the first linkage is pivotally coupled to the second body at a fourth pivot, and the second linkage is pivotally coupled to the third slider at a fifth pivot.

11. The rotary actuation mechanism of claim 8, wherein the first actuator and the second actuator are in a parallel or a perpendicular relationship with one another.

12. The rotary actuation mechanism of claim 8, wherein the first actuator and the second actuator are out of phase with one another.

13. The rotary actuation mechanism of claim 8, wherein the first actuator and the second actuator are in a parallel relationship with one another, and the anti-singularity device is operable with the first actuator and the second actuator.

14. The rotary actuation mechanism of claim 13, wherein the second slider of the anti-singularity device couples the first and second bodies of the parallel actuators, wherein the second linear path of the second slider is perpendicular to the first and third linear paths of the respective first and third sliders.

15. The rotary actuation mechanism of claim 13, wherein the second slider of the anti-singularity device couples the first and third sliders of the parallel actuators, wherein the second linear path of the second slider is perpendicular to the linear paths of the first and third sliders.

16. The rotary actuation mechanism of claim 1, wherein the anti-singularity device comprises a second actuator having a second body, and the second slider movable on the second linear path relative to the second body, wherein the first actuator and the second actuator are in a perpendicular relationship with one another.

17. The rotary actuation mechanism of claim 16, wherein the second body is pivotally coupled to the first linkage about the first axis, and the second slider is pivotally coupled to the second linkage at a fourth pivot.

18. The rotary actuation mechanism of claim 17, wherein the rotary actuation mechanism is configured for continuous rotary motion about the first axis.

19. A method for facilitating rotary actuation, comprising:
    obtaining an actuator having a body and a first slider movable on a first linear path relative to the body;
    facilitating pivotal coupling of a first linkage to the body at a first pivot having a first axis;
    facilitating pivotal coupling of a second linkage to the first slider at a second pivot having a second axis, and facilitating pivotal coupling of the second linkage to the first linkage at a third pivot,
    wherein a length of the first linkage between the first pivot and the third pivot is equal to a length of the second linkage between the second pivot and the third pivot, wherein the first slider is movable to position the second axis in a collinear relationship with the first axis; and preventing, with an anti-singularity device, rotation of the body relative to the first and second linkages about the first axis and the second axis when the first and second axes are in the collinear relationship, the anti-singularity device having a second slider coupling the body and the second linkage, wherein a second linear path of the second slider relative to the body intersects the first axis perpendicular to the first linear path of the first slider.

* * * * *